Feb. 7, 1956  G. M. J. CORNET  2,733,603
CALORIE METER

Filed July 2, 1951  4 Sheets-Sheet 1

INVENTOR
G. M. J. CORNET
By Wilkinson + Mawhinney
ATTYS.

Feb. 7, 1956  G. M. J. CORNET  2,733,603
CALORIE METER

Filed July 2, 1951 4 Sheets-Sheet 2

INVENTOR
G. M. J. CORNET
By Wilkinson + Mawhinney
ATTYS.

Feb. 7, 1956 G. M. J. CORNET 2,733,603
CALORIE METER
Filed July 2, 1951 4 Sheets-Sheet 3
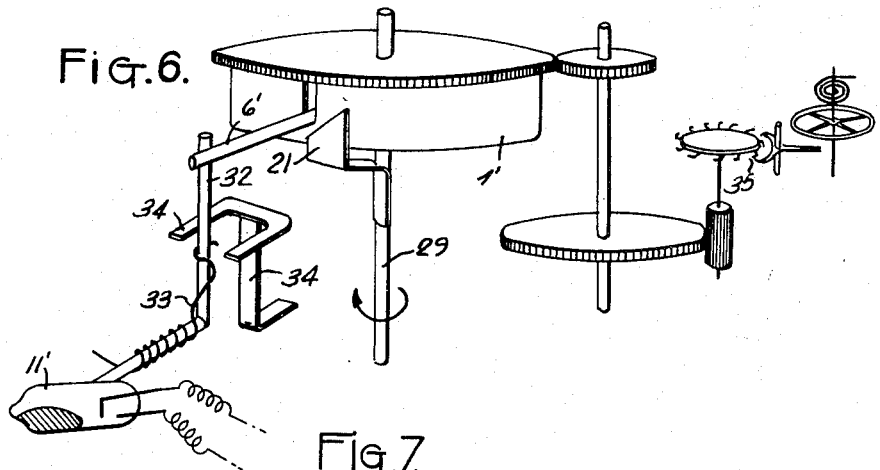
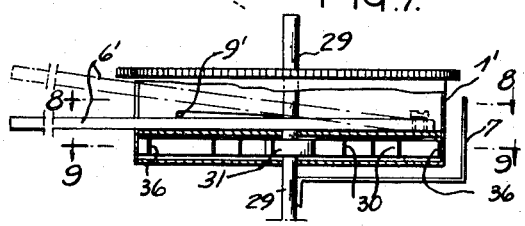
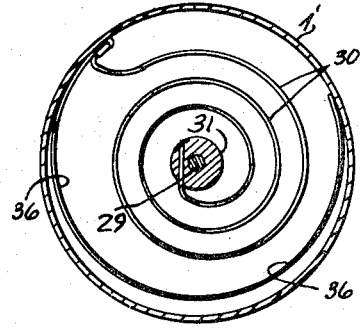
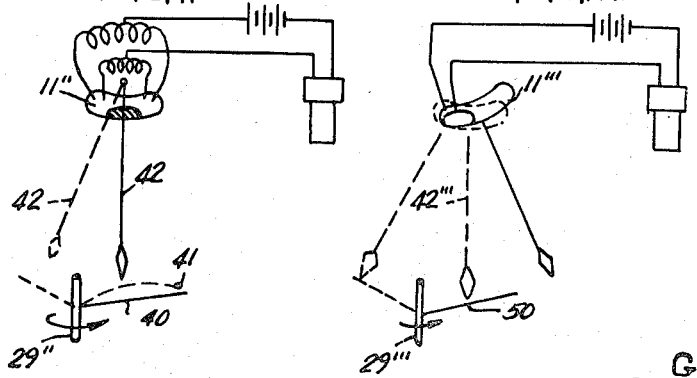
INVENTOR
G. M. J. CORNET
By Wilkinson + Mawhinney
ATTYS.

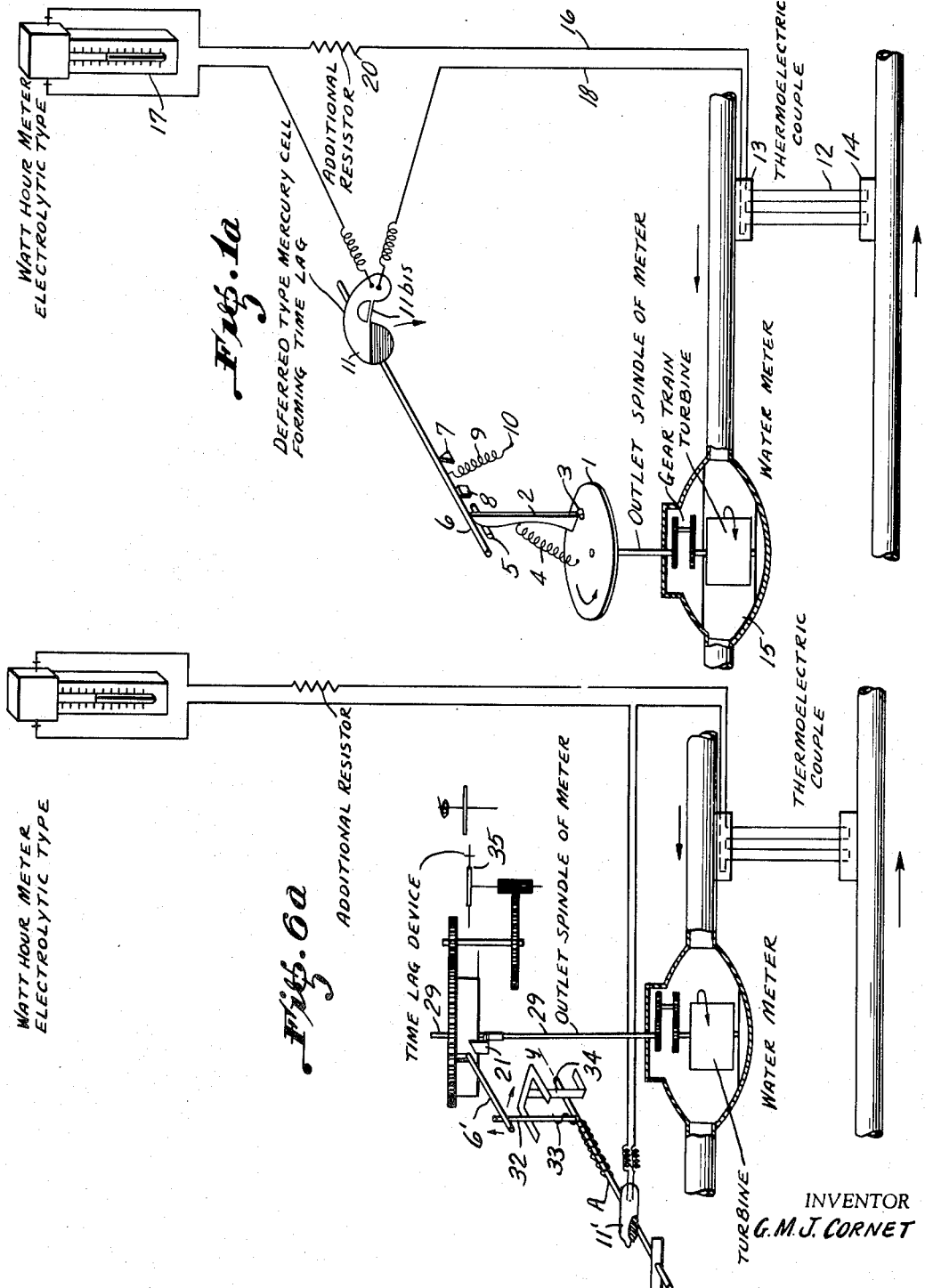

United States Patent Office 2,733,603
Patented Feb. 7, 1956

2,733,603

CALORIE METER

Guy Marie Joseph Cornet, Paris, France

Application July 2, 1951, Serial No. 234,695

Claims priority, application France July 4, 1950

3 Claims. (Cl. 73—193)

In warm water distribution installations providing a supply of warm water to a number of consumers, only volumetric meters of known types are as a rule available. But when consumers use said water, it may be more or less warm. It is thus not fair to bill in the same manner consumers having used an equal volume of water when the water used has different thermal energies.

To obviate said drawback, this invention relates to a warm water meter which achieves a constant or fractional integration of the thermal units actually consumed by the user.

The device according to this invention measures a series of identical volumes of water, the temperature of which is measured each time, for a certain time, always the same. The integration: fixed volume multiplied by variable temperature being achieved by suitable means, the amperage accurately corresponding to the thermal units supplied by the plant may be directly read on a meter.

Said device comprises the following parts in combination: a water output meter, a thermo-electric couple supplying to an electricity meter a current proportional to the difference between a reference temperature and the temperature of the water flowing in the water meter and means by which said water meter closes, when a predetermined volume of water has flowed, the circuit connecting said thermocouple to said electricity meter during a strictly constant time, whereby the electricity meter records a current flow proportional both to the water output and to the water temperature.

Other advantages and features of the invention will be evidenced by the following description, reference being had to the appended drawing given as an example, the various figures showing several forms of embodiment.

In said drawing:

Figure 1a shows a general view of the device in accordance with the first embodiment of the invention.

Fig. 6 is a perspective view of another form of embodiment comprising a spring barrel.

Figure 6a is a view similar to Figure 1a but showing the embodiment of the invention according to Figures 6 through 9.

Fig. 7 is a section through the said barrel.

Figs. 8 and 9 are two horizontal sections respectively along the lines 8—8 and 9—9.

Figs. 10 and 11 show, very diagrammatically, two further embodiments making use of a pendulum.

As shown in Figures 1 to 4, the device according to the invention comprises a volumetric meter which may be of any known type, either of piston or turbine type, fitted in a warm water supply piping. On the shaft driven by the turbine is mounted a disc 1, for example of circular shape. Said disc is mounted in such a manner for example that a complete revolution will correspond to an output of ten litres of water. On said disc is mounted, excentrically to the axis of rotation, a small lever 2 of suitable shape, preferably triangular, which may pivot at 3 about a radial pin and which, under the action of a spring 4, will tend to remain vertical, said position being shown in Figures 1 and 4. A fixed finger 5 fitted outside the disc rocks lever 2 about said pin when the disc rotates, until the displacement of the disc enables it to pass under the fixed finger and to get back to vertical position when it is thus suddenly released.

Figure 1:
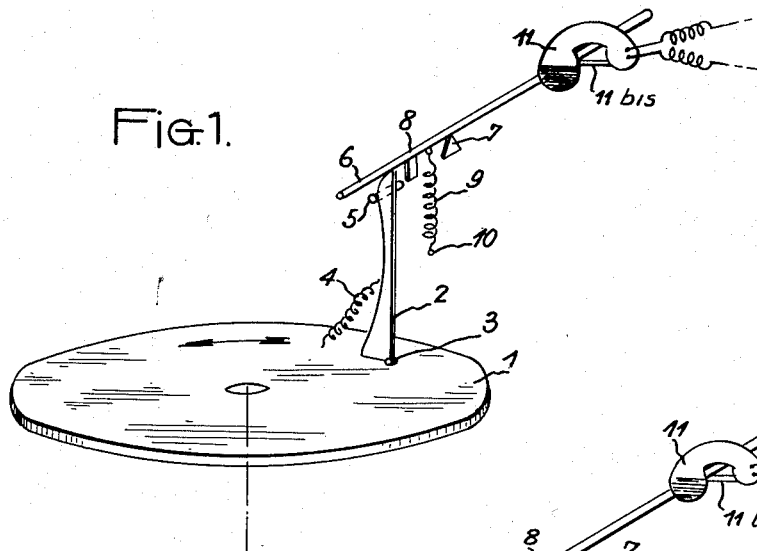
Fig. 1 is a perspective view showing a mechanical device for closing the electric circuit during a strictly constant time.
Figure 2:
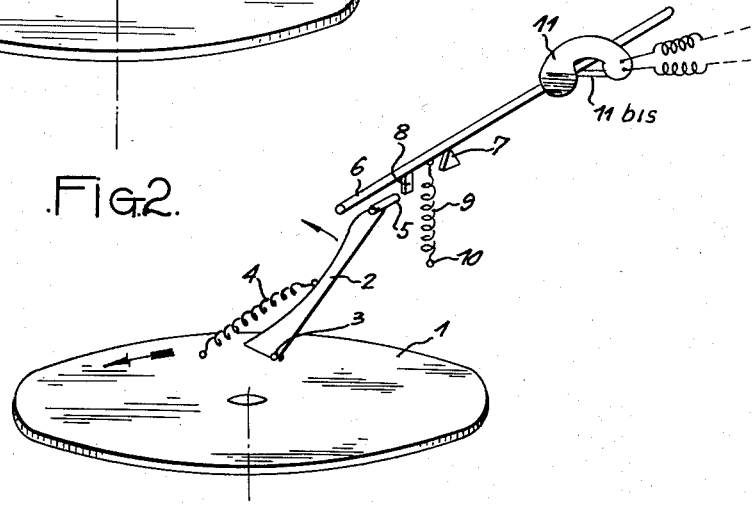
Fig. 2 shows the same device an instant before its tripping.
Figure 3:
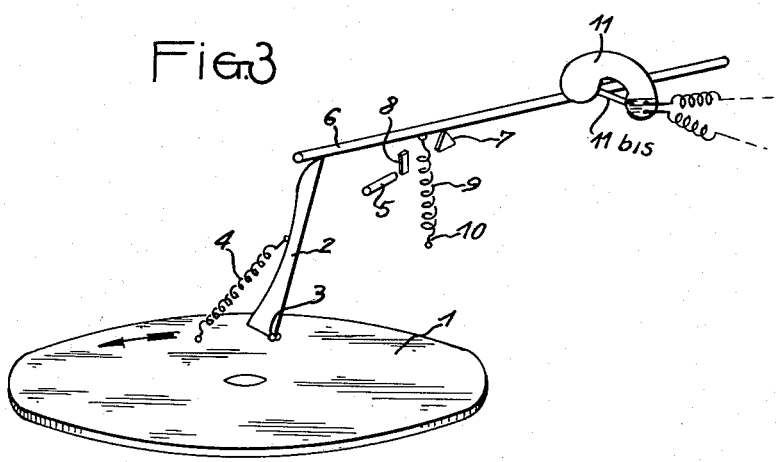
Fig. 3 shows the same device tripped, the electric circuit being closed.
Figure 4:
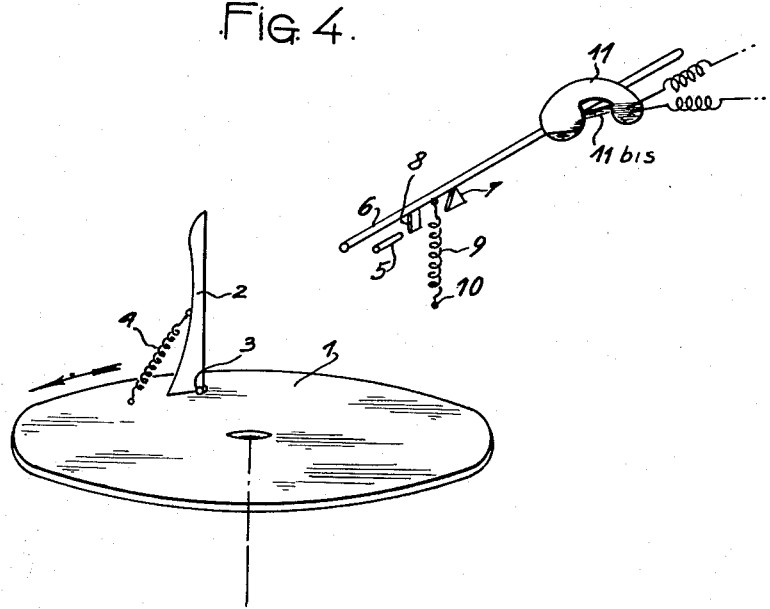
Fig. 4 shows the same device in a later position.

A scale beam 6 oscillating on a knife 7 rests in its normal position on a stop 8 under the action of a spring 9 attached to a fixed point 10. In said position, one of the ends of the beam is parallel to finger 5 and close to it, as shown in Figures 1, 2 and 4. The other end of the beam is provided with a mercury switch 11 of the time lag type.

Figure 5:
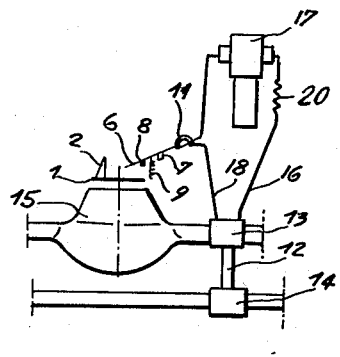
Fig. 5 is a diagrammatic view of the water meter and thermocouple-meter circuit.

A thermo-electric couple 12 (Figure 5) adapted to supply a sufficient electromotive force has its hot pole 13 on the piping feeding the volumetric meter 15, as close as possible to the latter. Its cold pole 14 is placed for example on the cold water piping closest at hand.

One of the output leads 16 of the thermocouple is directly connected to a terminal of an electric meter 17, the other lead 18 being connected to one of the electrodes of a switch 11, the other electrode being connected by a lead 19 to the other terminal of meter 17. An auxiliary resistor 20 may be inserted into the circuit to adjust the readings of meter 17 which may suitably be of the electrolytic type, capable of recording low current intensities.

The device described above must meet the three following requirements:

(a) An always identical volume of water, which may flow in a variable time, automatically closes the circuit of the thermoelectric cell.

(b) The circuit of the cell, the current intensity of which varies due to differences in temperature, will be automatically opened for an always identical period of time.

(c) The time during which the cell contact is to operate must be shorter than the shortest time during which the volume of water, selected as a measuring base, is able to flow through the volumetric meter.

As shown in Figures 1 to 4, the operation of the device is as follows: when the disc 1 has rotated one full revolution corresponding for example to ten litres, the lever 2, previously rocked forward due to the resistance opposed by the fixed finger 5, is suddenly released under the action of the spring 4.

When thus released it acts upon the scale beam 6 which is angularly displaced by a predetermined amount. Mercury contained in switch 11 flows into the cavity in which are located the electrodes which are thus electrically connected. The lever 2, having become disengaged from the beam 6, resumes its initial position under the action of spring 9, but mercury flows into the other cavity of switch; only after a predetermined time, since it must flow through a restricted passage 11 bis of the switch. At the end of said time, electrodes are no longer electrically connected and the circuit is open. The electrolytic meter 17 (Fig. 5) is thus operated only during the time when the electrodes are electrically connected.

Obviously, the mercury switch must be designed so that the time taken for the return flow of the mercury from the cavity in which the electrodes are fitted to the other cavity must be smaller than the shortest time required by the disc to make a complete revolution.

Thus a succession of identical volumes is provided, whatever be the speed of the disc. The time taken for measuring the temperature will be always the same, the current flow being adjusted beforehand.

The integration: fixed volume by variable temperature being obtained, the amperage corresponding exactly to the thermal units supplied by the system will be read on the meter.

In the above described form of embodiment, the drive shaft of the turbine may stop in any position without the current being able to flow indefinitely in the circuit.

The device shown in Figures 6 to 9 essentially comprises a barrel device whose drum 1' is mounted idle on the chosen spindle 29 of the volumetric meter, the inner end of the barrel spring 30 being secured to a fitting 31 integral with said spindle. Within said barrel, a finger 6' is pivoted in such a manner that it can pivot in a vertical plane, said finger extending outside the barrel and a spring 9' urging it constantly towards its horizontal position (in full lines in Fig. 6). On the spindle 29 is keyed a cam 21 adapted to lift the finger 6'. This finger cooperates, in the manner to be hereinafter described, with the arm 32 of a mercury switch 11' having its two electrodes respectively connected to the thermo-electric couple and to the electricity meter. A spring 33 always urges this switch into the closed position of the circuit (opposite position to that shown in Fig. 6). The two limiting positions of the arm 32 are defined by both legs of the stop 34.

The speed of rotation of barrel 1' under the action of its spring 30, is maintained strictly constant due to an anchor escapement device 35 of any suitable and known type.

This device operates as follows:

At rest, the parts are in the position shown in Figure 6. The finger 6' of barrel 1', whose spring 9' urges constantly in the direction of the arrow X', locks the arm 32 in the position in which the circuit is cut off by the switch 11'.

When water flows in the turbine of the volumetric meter, the spindle 29 rotates in the direction of the arrow and at the same time winds up the spring 30 since the barrel is arrested by the arm 32 against which abuts the finger 6'.

However, at a definite instant, the cam 21, which rotates with the spindle 29, raises the finger 6'; the arm 32 is thus released and under the action of the spring 33, the switch 11' comes into the position in which the circuit is closed. At the same time, in as much as the finger has moved away from the arm 32, the barrel can rotate under the action of its spring 30. After a complete revolution, which is always carried out in the same time due to the anchor escapement 35, the finger 6' again abuts the arm 32 and brings it back to the position shown in Fig. 6, in which the circuit is cut off.

The speed of rotation of the barrel 1' must, of course, be adjusted to a value which is slightly greater than that of the maximum speed of the spindle 29. In this manner, the finger 6' has always returned to its normal position upon the return of the cam 21 opposite said finger, during its rotation.

As, on the one hand, a complete revolution of the spindle 29 is always carried out for a same volume of warm water and causes the electric circuit to be closed for a strictly constant period of time and as, on the other hand, the thermo-electric couple gives rise to a current proportional to the temperature of the warm water, it is obvious that the electricity meter actually registers a current which is a function both of the volume of water and of its temperature.

In order to limit the strain in case of high outputs, the spring 30 is hooked onto the barrel 1' through the medium of a spring 36 (Fig. 9).

The device shown in Fig. 10 will now be described. The spindle 29" which is driven by the mechanism of the volumetric meter turbine carries a pivoted device or simply a spring blade 40 which, owing to the rotation of the turbine, abuts, at each rotation of the spindle 29", a fixed point 41 situated at a suitable distance from said spindle. As this spindle continues its movement of rotation, the spring 40 becomes arched until it becomes suddenly released from the fixed point 41. At this moment, as it is released with a certain amount of energy, it hits the end of a pendulum 42 to which it imparts a certain movement before it is released therefrom to reach its relaxed position.

The pendulum 42, having a predetermined weight and length, continues its pendulous movement until, with the diminution of its amplitude, it comes to a standstill in the original vertical position.

It should be noted that the time taken by the oscillations of the pendulum and by its return to this position is always identical, the movement which initiates the greatest amplitude being produced by an equal force and being determined, in the example chosen, by the elasticity of the spring 40 in regard to the fixed point 41.

The pendulum carries the mercury switch 11" having as reduced a size and weight as possible.

When the pendulum is at rest, the mercury is located in the hollow portion of the cell. As soon as the pendulum is oscillated by the release of the spring 40, the electrodes come alternately into contact with the mercury mass whereby current passes for a fraction of a second.

As the total time of contact is a function of the time of oscillation of the pendulum (which is always identical for each release of the spring 40), for each rotation of the spindle 29" a "time of temperature determination" is measured, said time being always identical.

The above described device can be simplified in the following manner, as shown in Figure 11. The spindle 29'" carries a rigid finger 50 which, during its travel, comes into contact at a given moment with the end of the pendulum 42'". The pendulum and spindle arrangement is so set that at a given moment, the end of the pendulum can escape the finger 50 when the latter has described an arc of a circle. The mercury cell 9'" carries electrodes only at one of its ends so that the current can only pass at the instant when the pendulum has escaped the finger 50 and comes into the opposite position. This arrangement avoids undesired contacts when a stoppage of the volumetric meter occurs, i. e. of the finger 50 between the instant when this finger acts on the pendulum and the instant when it releases same.

The measure of the "time of temperature determination" corresponds to half the period of oscillation of the pendulum and is always identical, the point of separation of the finger and of the pendulum being always invariable.

In the foregoing description, the invention has more particularly been described in its application to warm water meters. However, it is obvious that it can be applied to other uses. It can, in particular, be applied to calorie meters in general, for example in central heating installations: in this latter application, the temperature of the returning heating fluid may be taken, with advantage, as the reference temperature.

I claim:

1. A calorie meter, in particular for warm water comprising, in combination, a water meter comprising a rotary spindle, a watt-hour meter, a thermoelectric couple, a circuit connecting said watt-hour meter to said thermoelectric couple, the hot pole of which is adapted to be placed on a hot piping feeding said water meter as close as possible to it, while its cold pole is adapted to be placed on a cold water piping, to produce in the said watt-hour meter a current which is a function of the difference between the temperature of the cold water and the temperature of the hot water flowing through the water meter, a switch in said circuit, said switch being a mercury switch of the time lag type constituted by a member having two cavities in one of which are located electrodes electrically connected to said circuit, said member being formed to provide a restricted passage for communication between the cavities adapted to control the speed of the mercury flowing in said restricted passage, said restricted passage constituting a time switch adapted to control the passage of the current for a constant time interval, a pivotally mounted rocking rod carrying said switch and provided with a retracting device and a controlling device actuated by said water meter and adapted to rock said time switch, said controlling device comprising in combination the spindle driven by the water meter and an eccentric member cooperating with said rocking rod and rotating eccentrically with respect to said spindle and mounted on the latter in such a manner that a complete revolution of the spindle corresponds to a definite volume of water flowing through said water meter, said eccentric member rocking said rocking rod to close the circuit during a constant time controlled by said time switch, so that the said watt-hour meter registers a current which is a function both of the water flow and of its temperature.

2. A calorie meter, in particular for warm water comprising in combination, a water meter comprising a rotary spindle, a watt-hour meter, a thermoelectric couple, a circuit connecting said watt-hour meter to said thermoelectric couple, the hot pole of which is adapted to be placed on a hot piping feeding said water meter as close as possible to it, while its cold pole is adapted to be placed on a cold water piping, to produce in the said watt-hour meter a current which is a function of the difference between the temperature of the cold water and the temperature of the hot water flowing through the water meter, a switch in said circuit, said switch being a mercury rocking switch, comprising two electrodes respectively connected to said thermoelectric couple and to said watt-hour meter, a retracting device adapted to urge said switch in a position in which the circuit is closed, an anchor escapement device adapted to control the passage of electric current during a constant time, and a controlling device actuated by said water meter and adapted to lock said switch in its open position, said device being constituted in combination, by a barrel device comprising a drum cooperating with said anchor escapement device and mounted idle on the rotary spindle of said water meter, a horizontal finger cooperating with said mercury rocking switch and pivotally mounted in said barrel and extending outside of the latter, a drawback device adapted to urge said finger towards its horizontal position, said finger being adapted to rock said switch and to bring it in a position in which the circuit is opened, a spiral spring secured on the one hand to the rotary spindle of said water meter, and on the other hand to said barrel, a cam keyed on said spindle and rotated with said spindle and adapted to raise said finger whereby the switch comes into the position in which the circuit is closed, the time during which this position is maintained being controlled by the rotation speed of said barrel, said speed being controlled by said anchor escapement device so that the said watt-hour meter registers a current which is a function both of the water flow and of its temperature.

3. A caloric meter for measuring the heat units of a hot water system having hot water input and cold water discharge conduits comprising a watt-hour meter, an electric circuit for actuating said meter comprising a thermoelectric couple the poles of which are respectively connected to the hot and cold water conduits, a water meter having a turbine connected to one of the conduits of the water system, mechanical means comprising amongst others an electric switch, the terminals of which are connected to the said electric circuit and a member rotating with the turbine of the said water meter said member being connected to said switch to actuate it once for each revolution of the rotating member, said switch being adapted so as to remain closed for a predetermined constant period of time following actuation thereof, said water meter constituting the sole means for actuating the mechanical means, the period of closure of said switch being lower than the period of time corresponding to the flow of said predetermined amount of water under the conditions of maximum flow.

References Cited in the file of this patent

UNITED STATES PATENTS

| | | |
|---|---|---|
| 1,386,937 | Kock | Aug. 9, 1921 |
| 2,359,767 | Keinath | Oct. 10, 1944 |

FOREIGN PATENTS

| | | |
|---|---|---|
| 604,491 | Germany | Oct. 22, 1934 |
| 628,971 | Germany | Apr. 20, 1936 |
| 650,914 | Germany | Oct. 5, 1937 |